US012522470B2

(12) United States Patent
Lo Jacono et al.

(10) Patent No.: US 12,522,470 B2
(45) Date of Patent: Jan. 13, 2026

(54) ELEVATOR SYSTEM

(71) Applicant: Inventio AG, Hergiswil (CH)

(72) Inventors: Romeo Lo Jacono, Gravesano (CH); Gilles Trottmann, Meierskappel (CH); Nilesh Thombare, Maharashtra (IN); Erich Butler, Ebikon (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/835,373

(22) PCT Filed: Feb. 6, 2023

(86) PCT No.: PCT/EP2023/052750
§ 371 (c)(1),
(2) Date: Aug. 2, 2024

(87) PCT Pub. No.: WO2023/152060
PCT Pub. Date: Aug. 17, 2023

(65) Prior Publication Data

US 2025/0162837 A1 May 22, 2025

(30) Foreign Application Priority Data

Feb. 9, 2022 (EP) .................................... 22155782

(51) Int. Cl.
*B66B 5/00* (2006.01)

(52) U.S. Cl.
CPC .................................. *B66B 5/0081* (2013.01)

(58) Field of Classification Search
CPC .................................................... B66B 5/0081
See application file for complete search history.

(56) References Cited

U.S. PATENT DOCUMENTS

| | | | | |
|---|---|---|---|---|
| 9,764,925 | B2 * | 9/2017 | Cheng | B66B 1/50 |
| 2018/0002139 | A1 * | 1/2018 | Stepp | B66B 11/0226 |
| 2019/0241399 | A1 * | 8/2019 | Kattainen | B66B 1/3492 |

FOREIGN PATENT DOCUMENTS

| | | | |
|---|---|---|---|
| EP | 4005961 | A1 | 6/2022 |
| JP | 2009067480 | A | 4/2009 |
| WO | 2020127303 | A1 | 6/2020 |
| WO | 2020127787 | A1 | 6/2020 |

* cited by examiner

*Primary Examiner* — Minh Truong
(74) *Attorney, Agent, or Firm* — Shumaker, Loop & Kendrick, LLP

(57) ABSTRACT

An elevator system has an elevator car with a roof on which roof a balustrade is arranged as a fall protection for delimiting an accessible inner region on the roof. The balustrade includes a guide rail engagement means via which the balustrade can be brought into engagement with a guide rail by a latching mechanism for a secure position such that the balustrade is supported inwardly and outwardly on the guide rail in the secure position.

13 Claims, 5 Drawing Sheets

Fig. 8
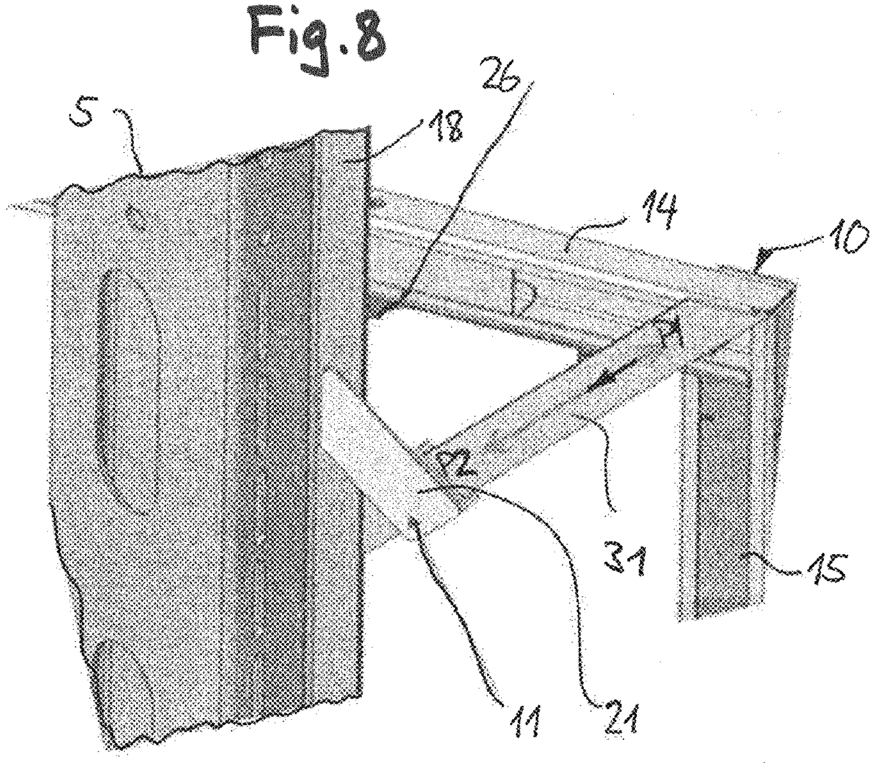
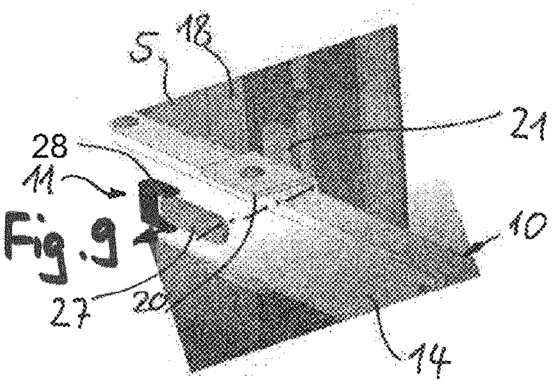
Fig. 9
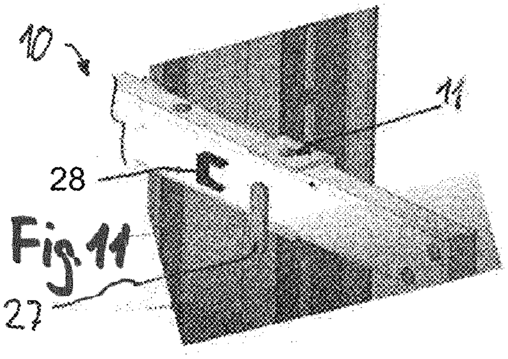
Fig. 11
Fig. 10
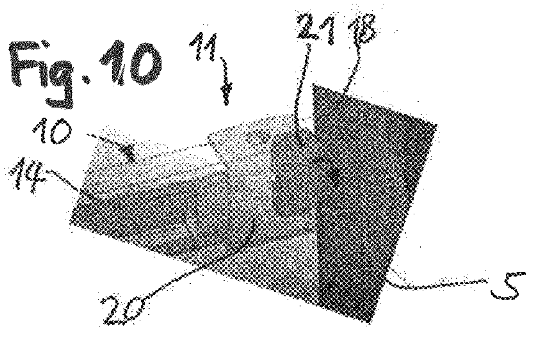
Fig. 12
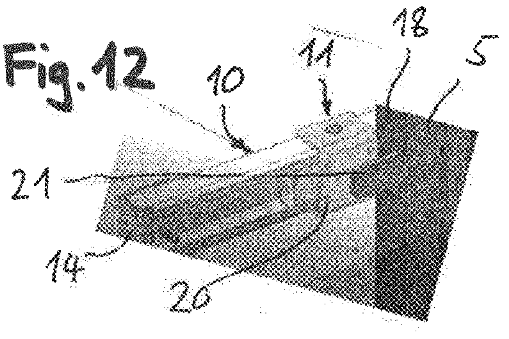

ELEVATOR SYSTEM

FIELD

The invention relates to an elevator system having a balustrade arranged on a roof of an elevator car as a fall protection for delimiting an accessible inner region on the roof.

BACKGROUND

Elevator systems contain elevator cars that can be moved up and down in an elevator shaft via support means, for example in the form of hoist cables or suspension belts, by means of a drive unit. For specific situations, such as maintenance work or inspections, it is necessary for people to be on the car roof. If the width of a gap between the elevator car and the adjacent shaft wall is too large, balustrades must be installed on the car roof to prevent falls.

Balustrades on the roof of elevator cars have been known and used for a long time. The balustrades include vertical posts and horizontal post-connecting crossmembers. The crossmembers can have at least one handrail which forms the uppermost crossmember. For example, the ASME A17.1-2000 standard for the USA or the European standard EN81-20:2014 contain instructions with detailed specifications for the design and dimensioning of the car roof and the necessary balustrade. In order to ensure sufficient stability, the known balustrades are comparatively heavy and expensive.

SUMMARY

It is therefore an object of the present invention to avoid the disadvantages of the known elevator system and in particular to create an improved elevator system. The elevator system comprises an elevator car having a balustrade arranged on its roof, which balustrade is intended to protect people from falling into the car shaft in a simple and safe manner.

According to the invention, this object and other objects are achieved by an elevator system having an elevator car that can be guided or is guided in a vertical direction along at least one guide rail. The elevator system can further comprise an elevator shaft. The elevator car can be moved up and down along the guide rails, which are preferably arranged in the elevator shaft. The elevator car has a roof having a balustrade arranged thereon as a fall protection for delimiting an accessible inner region on the roof. For example, a person can safely remain on the inner region of the roof for maintenance work. To the outside, there is the adjacent shaft wall to which a guide rail can be attached. However, it is also conceivable that the guide rail is positioned on the aforementioned adjacent shaft wall, but there is no direct connection between the guide rail and the shaft wall in question. The guide rail can, for example, be connected to the elevator shaft via a support structure that is fixed to the elevator shaft on the shaft door side.

The balustrade comprises guide rail engagement means via which the balustrade can be supported inwardly on one of the guide rails. In other words, the balustrade can be engaged with at least one of the guide rails in the secure position via or with the aid of the guide rail engagement means in such a way that the balustrade is supported inwardly or in the direction of the inner region in the secure position. The fact that the balustrade comprises guide rail engagement means, via which the balustrade can be supported inwardly on one of the guide rails results in a plurality of advantages. Thanks to the inward support, it is ensured that when horizontal forces are applied from the outside to the inside, for example when a person pulls on the balustrade, unwanted yielding can easily be prevented. The balustrade can therefore be constructed from comparatively light and thin structures.

The elevator system can further comprise at least one counterweight that can be moved up and down in the opposite direction to the elevator car. This at least one counterweight is also preferably guided on guide rails (counterweight guide rails). For certain elevator configurations, it is also conceivable that the balustrade comprises guide rail engagement means, via which the balustrade can be supported inwardly on the counterweight guide rail(s). It is also conceivable that the guide rail in question, on which the balustrade is supported inwardly in the secure position, is intended to guide both the elevator car and the counterweight.

The operative connection between the balustrade and the guide rail does not have to be permanent. The guide rail can also be loaded by the guide rail engagement means only temporarily, such as during certain operating phases of the elevator system (e.g., during a maintenance phase when work is being carried out on the roof). If the operative connection between the balustrade and the guide rail exists, the balustrade is in the secure position. The balustrade can be moved from the secure position back to a position, for example for normal operation of the elevator system, in which the operative connection is released.

Preferably, the balustrade comprises guide rail engagement means via which the balustrade can be brought into engagement with the guide rail in the secure position such that the balustrade is supported both inwardly and outwardly in the secure position. Thanks to the outward support, it can be ensured that when horizontal forces are applied from the inside to the outside, for example when a person leans over the balustrade or falls from the roof onto the balustrade, unwanted outward yielding can easily be prevented. Elaborate, complex and costly structural measures for the stable design and attachment of the balustrade to the car roof can be dispensed with.

The guide rail engagement means can be arranged on the handrail of the balustrade. However, it is also conceivable to arrange the guide rail engagement means alternatively or possibly even additionally on horizontal crossmembers arranged below the handrail. It is also conceivable to attach the guide rail engagement means to posts.

The balustrade can be installed on or adjacent to a roof edge. This roof edge runs in a generally horizontal direction, which direction is referred to below as the lateral longitudinal direction for the sake of simplicity. The guide rail can have a profile portion forming a spring, having a free end and extending in the direction of the lateral longitudinal direction and preferably parallel to the lateral longitudinal direction. In other words, the aforementioned profile portion can run parallel to the adjacent shaft wall. Such a guide rail having a profile portion that forms a tongue for a tongue-and-groove connection is known, for example, from WO 2020/127303 A1. The balustrade comprising guide rail engagement means can be brought into engagement with this profile portion.

However, the balustrade can also be brought into engagement with other portions or parts of a guide rail. For example, if the elevator system has car guide rails that have a T profile shape, it would be conceivable to use the rail foot of the T-rails for the engagement. The rail foot can thus obviously also form a profile portion extending in the direction of the lateral longitudinal direction and preferably parallel to the lateral longitudinal direction.

To form the guide rail engagement means, the balustrade can have a locking element that can be latched into the guide rail, preferably via the aforementioned profile portion. This means that the balustrade can be connected to the guide rail easily and with little effort using a snap or latching mechanism, at least temporarily to carry out maintenance work.

The elevator system can be designed in such a way that at least when the guide rail engagement means are in engagement with the guide rail, no maintenance trips are made or are possible.

Furthermore, it can be advantageous if the locking element is attached to the handrail or to another part of the balustrade in a resilient and limitedly displaceable manner for the latching connection of the balustrade to the guide rail. The locking element can be preloaded by means of a spring. The spring causes the locking element to be preloaded in a locking position. The locking element can have an abutment that can be brought into engagement with a rear side of the profile portion of the guide rail. When the balustrade is connected to the guide rail in a latching manner, the locking element is in the locking position and the balustrade is in the advantageous secure position.

Furthermore, it can be advantageous if the balustrade is configured to be movable. Such a movable balustrade can, for example, be a folding or telescopic or otherwise vertically extendable balustrade. For example, if the folding balustrade has the locking element described above, the latching connection can be created automatically when the balustrade is moved into the upright position, which corresponds to the secure position of the balustrade.

The locking element can have a wedge-like latching lug. The latching lug can form a ramp that interacts with the free end of the profile portion of the guide rail to create the latching connection. The end of the profile portion runs up onto the ramp and initially pushes the latching lug away; in the locking position, the latching lug is pushed back again under the action of the spring.

The balustrade can have a manually or motor-operated blocking arrangement to form the guide rail engagement means, wherein the blocking arrangement can be brought into a blocking position to create the secure position of the balustrade by manual actuation, such as by sliding or pivoting. However, instead of manual operation, it may be advantageous if the blocking arrangement can be actuated automatically. The automatic actuation can be activated, for example, as soon as the movable balustrade is brought into the upright position.

The locking member can, for example, be mounted on the handrail of the balustrade so as to be pivotable about a horizontal axis. When the locking member is swung out in a horizontal position, the locking member is in the blocking position and consequently the balustrade is also in the secure position. By pivoting the locking member, the blocking position or secure position can be released again. The locking member can be plate-shaped at least in the engagement region.

The blocking arrangement can have an actuating lever or lever arm that is connected to the locking member rigidly or in a geared manner. The actuating lever can have a handle for manual actuation. Instead of the actuating lever, the blocking arrangement can also have a comparatively heavy lever arm that, after being triggered, falls downward under the force of gravity and thus allows the automatic pivoting of the locking member into the blocking position to create the secure position in a simple manner.

In an alternative embodiment, the balustrade can have an inclined crossmember on which the locking member is mounted so as to be displaceable between the rest position and the blocking position. In a further embodiment, the blocking arrangement can contain a U shaped engagement channel that, when the blocking arrangement is in the blocking position, engages around the profile portion of the guide rail or another portion or part of the guide rail from the side, resulting in the secure position of the balustrade.

DESCRIPTION OF THE DRAWINGS

Additional advantages and individual features of the invention are derived from the following description of an exemplary embodiment and from the drawings. In the drawings:

FIG. 9: is a front view of another guide rail engagement means in a rest position, FIG. 10: is a rear view of the guide rail engagement means of FIG. 9, FIG. 11: is the front view of the guide rail engagement means in a blocking position (balustrade in secure position), and FIG. 12: shows the activated securing means of FIG. 11 in the rear view.

DETAILED DESCRIPTION

Figure 1:
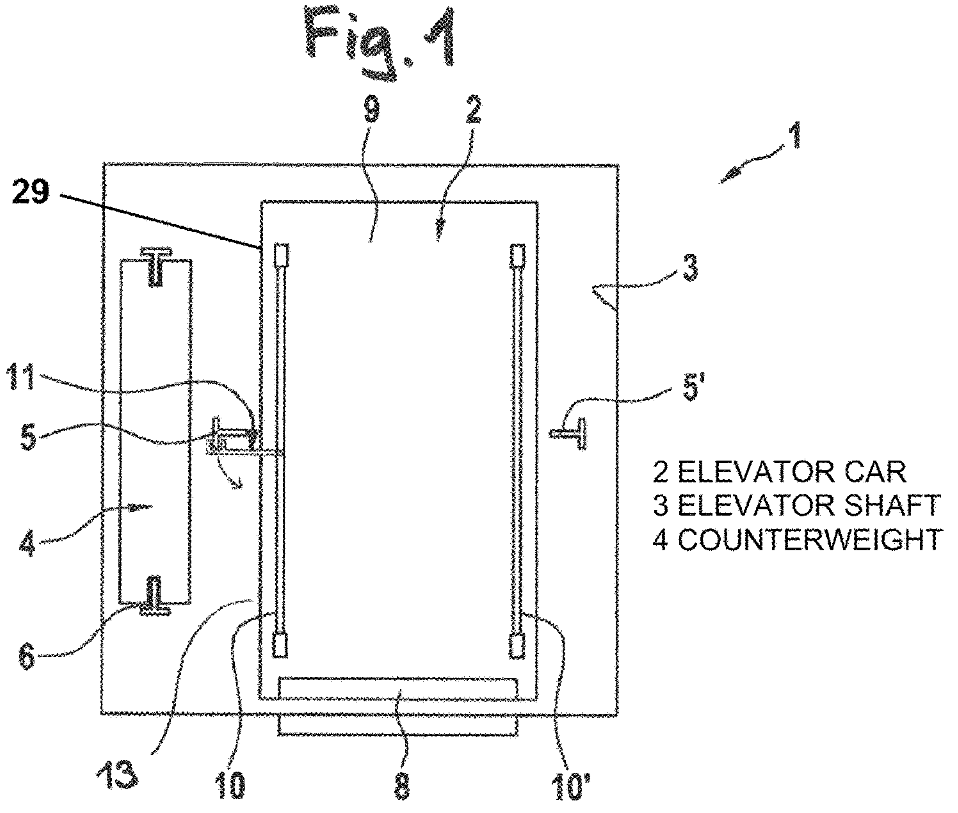
FIG. 1: is a simplified plan view of an elevator system according to the invention.

FIG. 1 shows an elevator installation, denoted by 1, for a multi-story building. The elevator system 1 contains an elevator car 2 that can be moved vertically up and down in an elevator shaft 3 for transporting people or goods to individual floors. The elevator car 2 is connected via support means (not shown here; however, cf. FIG. 2 below, in which the support means are denoted by 7) to a counterweight 4 that can be moved up and down in the opposite direction to the elevator car 2. Both the elevator car 2 and the counterweight 4 are guided on guide rails. The guide rails for guiding the elevator car are denoted by 5 and 5'. The guide rails for the counterweight 4 are the guide rails 6. The guide rails 5, 5' and the guide rails 6 are each formed by T-shaped metal profiles. The corresponding guide rail 5, 5', 6 has a rail foot and a rail web protruding at right angles therefrom. The rail foot is used to secure the guide rail in the elevator shaft, while the rail web provides the actual guidance. For this purpose, the rail web has guide surfaces along which sliding or roller guide shoes (not shown) assigned to the elevator car 2 or the counterweight 4 can be moved in a manner known per se.

A balustrade 10 is installed on the car roof 9 to provide fall protection. The balustrade 10 delimits an accessible inner region on the roof 9 from the outside. The balustrade 10 has guide rail engagement means denoted by 11, via which the balustrade 10 interacts with the guide rail 5 in a special manner. Via these engagement means 11, the balustrade 10 can be brought into engagement with the guide rail 5 in such a way that the balustrade 10 is supported inwardly (or more precisely in the direction of the inner region). The guide rail engagement means 11 have a blocking arrangement having a U-shaped engagement channel that engages around the rail foot of the guide rail 5 from the side. FIG. 1 shows not only a blocking position in which engagement is present (balustrade in secure position), but also a rest position of the guide rail engagement means 11 is indicated by means of an arrow. The engagement can be released by pivoting the blocking arrangement in the direction of the arrow. In this position, the blocking arrangement is in a rest position.

As can be seen, the balustrade 10 is installed adjacent to a roof edge running in a lateral longitudinal direction and denoted by 13. The rail web of the guide rail 5 formed by a T profile forms a profile portion with which the guide rail engagement means 11 can be brought into engagement with the U-shaped engagement channel 16 (see FIGS. 4 and 5).

In the elevator system 1 according to FIG. 1, the counterweight 4 is arranged on one side of the elevator car 2. On this side, the balustrade 10 for fall protection is arranged on the roof 9, which balustrade is operatively connected to the guide rail 5 via guide rail engagement means 11, the structure and mode of operation of which are shown and explained in detail below. In the front region having the car door 8 and on the opposite rear side, no balustrade parts are necessary due to the small gap widths.

For fall protection, mixed forms with new and conventional balustrades are also conceivable. For example, in the present case, a conventional balustrade 10' is provided on the opposite side of the elevator car 2, where the guide rail denoted by 5' for guiding the elevator car 2 is located. Of course, this balustrade 10' could also be equipped with guide rail engagement means 11 explained in detail below.

The balustrade 10 equipped with guide rail engagement means 11 is basically suitable for all types of elevator configurations or types. Instead of the elevator configuration shown in FIG. 1 with the counterweight 4 arranged on the side 29 of the car 2, the novel balustrade 10 can also be used, for example, in elevator systems in which the counterweight 4 is arranged in the region of a rear side of the elevator car 2.

Maintenance work is preferably carried out when the elevator car 2 is at a standstill. However, maintenance trips could also be carried out if necessary. There are regulations such as the European standard EN81-20:2014, according to which the horizontal distance between the handrail and the guide rail or other parts in the elevator shaft should not be less than a certain value (e.g., 10 cm according to section 5.4.7.4 lit. a of EN81-20). Because the horizontal distance between the handrail 14 (see FIG. 3) of the balustrade 10 and the guide rail 5 in the exemplary embodiment shown in FIG. 1 is greater than 10 cm, the safety of the person carrying out the maintenance would also be ensured during maintenance trips.

The balustrade 10 shown in FIG. 1 is designed as a rigid balustrade. Depending on the gap width, the balustrade 10 should protrude at least 70 cm, and preferably at least 110 cm beyond the roof 9. However, it can also be advantageous to equip movable balustrades with guide elements. Such movable balustrades are used in particular in elevator systems 1 that are characterized by low shaft head heights. As an alternative to the folding balustrade, a balustrade that can be extended vertically or telescopically is also conceivable. Such movable balustrades can also be equipped with the guide rail engagement means 11 described here.

Figure 2:
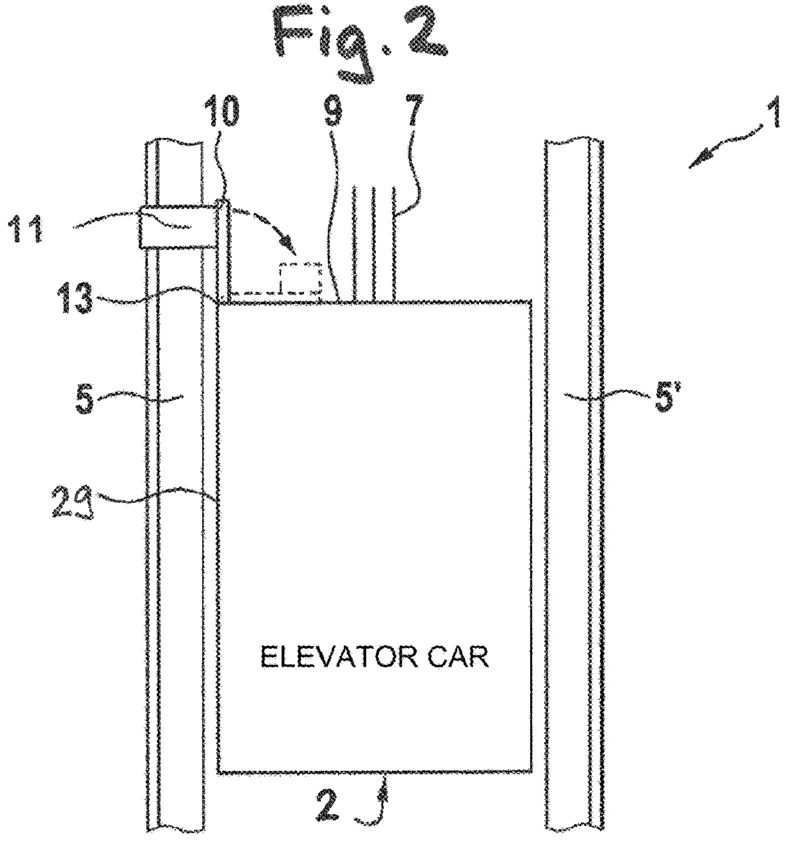
FIG. 2: is a highly simplified side view of another elevator system.

As can be seen from FIG. 2, guide rail engagement means 11 can also be combined with movable, in this case foldable, balustrades 10. The balustrade 10 is foldable, i.e., it can be pivoted between a folded-down position, which corresponds to a rest position (as shown by the dashed lines in FIG. 2), in which the balustrade is arranged substantially horizontally and thus parallel to the roof 9 of the elevator car 2, and an erected position, in which the balustrade 10 is arranged substantially vertically and thus perpendicular to the roof 9 of the elevator car 2.

When the balustrade 10 is erected, the guide rail engagement means 11 act on the guide rail 5. In this position, maintenance work can be carried out on the car roof 9, preferably with the elevator car at a standstill. The balustrade 10 is temporarily connected to the guide rail 5 via the guide rail engagement means 11 in such a way that the balustrade is supported inwardly and outwardly. When horizontal forces are applied from the inside to the outside, for example when a person on the roof presses against the balustrade, the support ensures that the balustrade 10 cannot give way any further and secures the person. Thanks to the inward support, it is ensured that when horizontal forces are applied from the outside to the inside, for example when a person pulls on the balustrade, unwanted yielding can easily be prevented.

Figure 3:
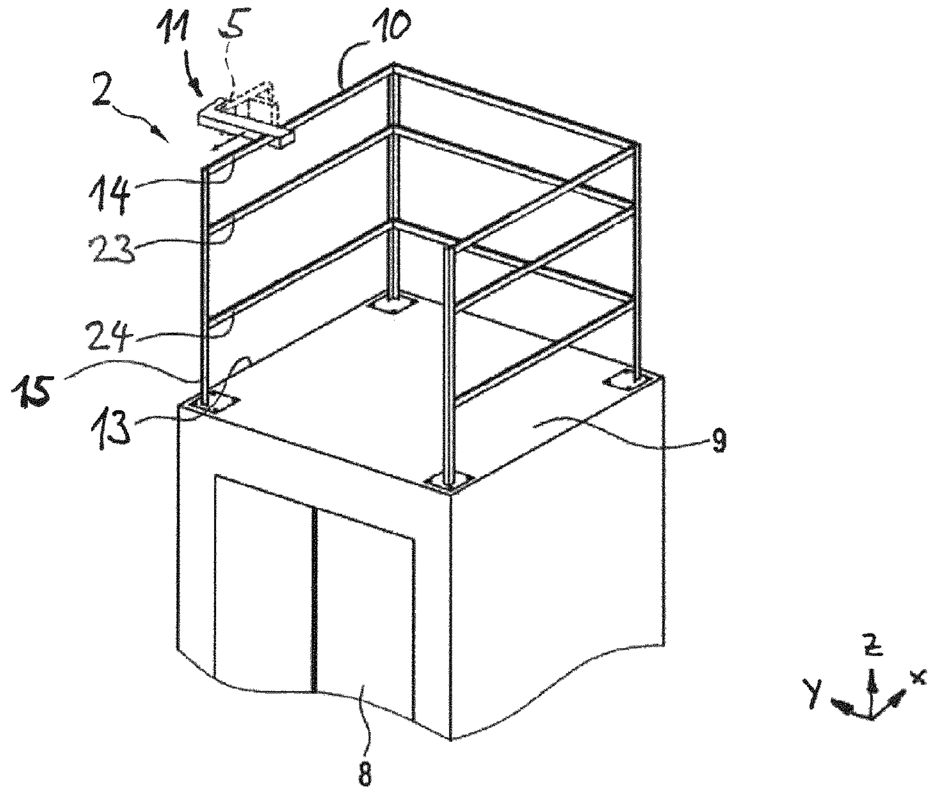
FIG. 3: is a perspective view of a car roof of an elevator car for an elevator system according to another exemplary embodiment.

FIG. 3 relates to a rigid balustrade 10 that forms a fall protection with respect to three sides of the elevator car 2. In contrast to the previous exemplary embodiments, in the exemplary embodiment according to FIG. 3 the balustrade 10 is only supported inwardly in the secure position. In the region of a front side in which the elevator car 2 is equipped with a car door 8, no fencing is necessary because of the small gap between the elevator car and the shaft wall. In this case, the balustrade 10 comprises, for example, a total of four vertical posts 15, wherein in each case two posts are connected to one another with three horizontal crossmembers 14, 23, 24. In this case, the topmost crossmember is a handrail 14. However, the balustrade 10 could also have only one handrail 14 on each side and a central crossmember at mid-height. It would also be conceivable to provide additional vertical struts to increase the stability of the balustrade.

The balustrade 10 usually has two guide rail engagement means 11 that are operatively connected to the respective guide rails 5, 5' in such a way that the balustrade 10 is supported inwardly in the secure position, wherein in FIG. 3 only the left guide rail 5 and the corresponding guide rail engagement means 11 are shown for better understanding. The elevator system 1 has a similarly configured guide rail on the opposite, right-hand side. As can be seen, the guide rail engagement means 11 are arranged on the respective handrails 14 of the balustrade 10.

The elevator system 1 can, as in FIGS. 1 to 3, have car guide rails 5, 5' that have a T-profile shape, in which guide rails the rail foot of the T-rails is used for the loading or for engagement of the guide rail engagement means 11. In the present case, the guide rail engagement means 11 are, by way of example, displaceably mounted on the handrail 14.

The engagement can be released by movement in the direction of the arrow (FIGS. 1 and 3). Below are shown and described various design variants of guide rail engagement means 11 that interact with specially designed guide rails 5.

Figure 4:
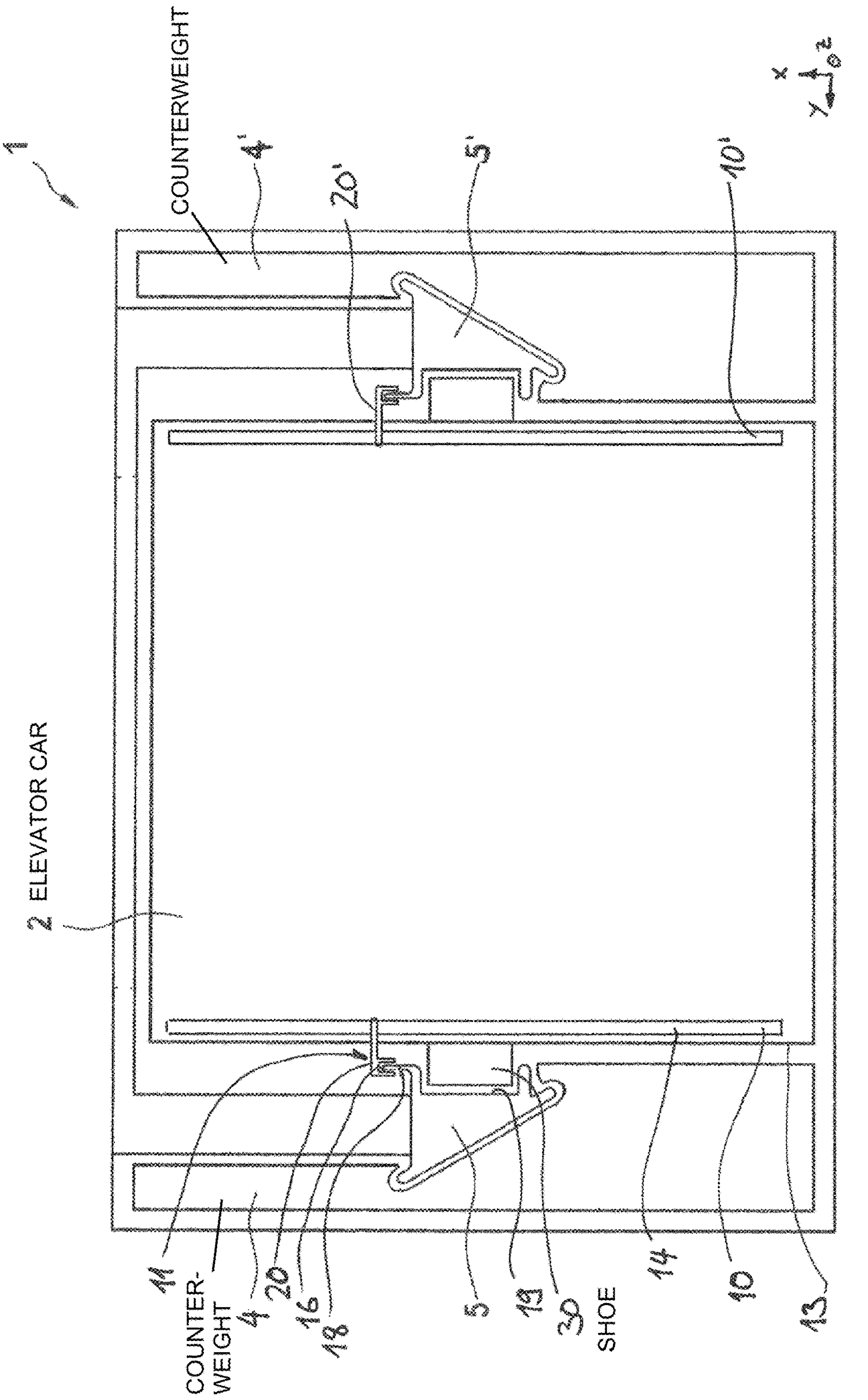
FIG. 4: is a plan view of an elevator system, wherein the elevator system has a balustrade that is operatively connected to the guide rails by means of engagement means.

FIG. 4 shows an elevator car 2 for an elevator system 1 which has two counterweights 4, 4' as well as support means and drives (not shown). The two drives (e.g., Koepe sheave drives) drive the respective support means (e.g., belts, steel ropes) and thus move the elevator car 2 and the two counterweights 4 and 4' in opposite directions. Each drive is associated with one of the counterweights 4, 4'. Two guide rails 5, 5' are provided on both sides of the elevator car 2 to guide the elevator car and the counterweights 4, 4'.

These guide rails 5, 5' serve as linear guides for both the elevator car 2 and the respective counterweights 4, 4'. The guide rails 5, 5' are manufactured as one-piece roll profiles. The elevator system 1 is designed as a so-called "front bag elevator." Further details on the front bag elevator and the guidance of the car and the counterweights with common guide rails can be found in WO 2020/127303 A1 and WO 2020/127787 A1.

The guide rail 5 (the same applies to the guide rail 5') has a profile portion denoted by 18, which forms a tongue for a tongue-and-groove connection and a guide surface 19 along which sliding or roller guide shoes 30 assigned to the elevator car 2 can be moved. This profile portion 18 forms an effective surface on which a car brake or safety gear acts in an emergency or braking situation. As can be seen, the profile portion 18 runs parallel to the lateral longitudinal direction. This lateral longitudinal direction is the direction in which the roof edge 13 runs. For better understanding, a Cartesian coordinate system with the axes x, y, z is shown in FIGS. 3 and 4. The lateral longitudinal direction runs in the x-direction, therefore the profile portion 18 also runs in the x-direction. The profile portion 18 can be used not only to brake the car, but can also to support the balustrade 10. For this purpose, the balustrade 10 has engagement means 11 that engage with the guide rail 5 in such a way that the balustrade 10 is supported both inwardly and outwardly. The balustrade 10 is thus blocked in the secure position by means of the guide rail 5.

The guide rail engagement means 11 are designed as blocking arrangements 20, 20'. The blocking arrangement 20 has, similarly to FIG. 1, a horseshoe-like or U-shaped, channel-like engagement portion 16 that engages around the profile portion 18 of the guide rail 5 from the side. When there is engagement between balustrade 10 and guide rail 5, a secure position is created. The engagement can be permanent or only temporary to carry out maintenance work. The exemplary embodiments shown below in FIGS. 6 to 12 relate to variants in which engagement is only temporary. Maintenance work is preferably carried out when the elevator car 2 is at a standstill. A safety device connected to the drive unit can prevent unwanted car travel during the maintenance phase. It would even be conceivable to provide guide rail engagement means 11 that are not only temporarily but permanently in engagement with the guide rail. In this case, the guide rail engagement means 11 can also assume a guiding function.

Figure 5:
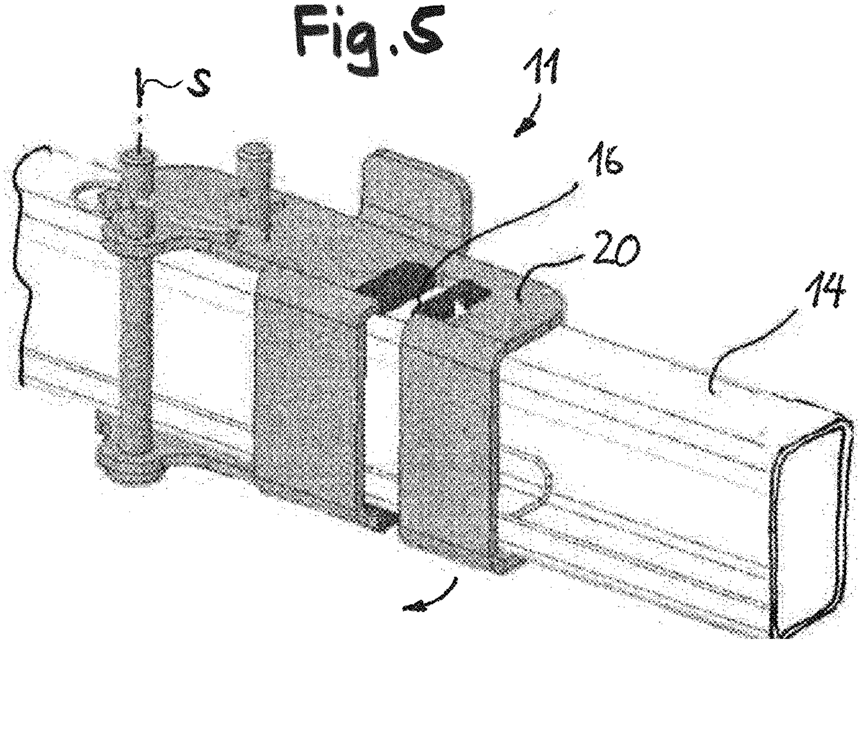
FIG. 5: shows a manually operable guide rail engagement means in a rest position.

FIG. 5 shows a possible structural design of a blocking arrangement 20 for forming guide rail engagement means 11 for an elevator system 1 in the manner of FIG. 4. The blocking arrangement 20 comprises a component made of a metal sheet, which component forms the channel-like engagement portion 16 complementary to the profile portion 18 (not shown here) of the guide rail 5. In FIG. 5, the blocking arrangement 20 is in a rest position. This position is assigned to the normal operation of the elevator system. For maintenance work, the blocking arrangement 20 can be moved to the blocking position. In the blocking position, the balustrade 10 is secured; the balustrade 10 is then in the secure position. In the present exemplary embodiment, the blocking arrangement 20 is pivotally attached to the handrail 14. The pivot axis is denoted by S. By pivoting in the direction of the arrow, the blocking arrangement 20 can be brought into the blocking position and the secure position of the balustrade 10 can be created.

Figure 6:
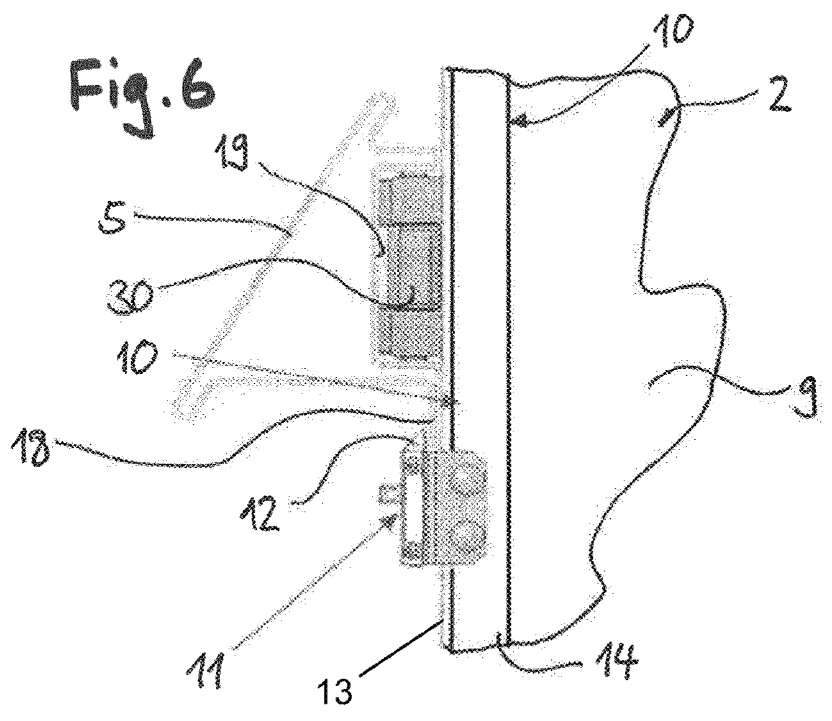
FIG. 6: is a detailed view of a guide rail in cross section and a balustrade in a secure position according to another exemplary embodiment.
Figure 7:
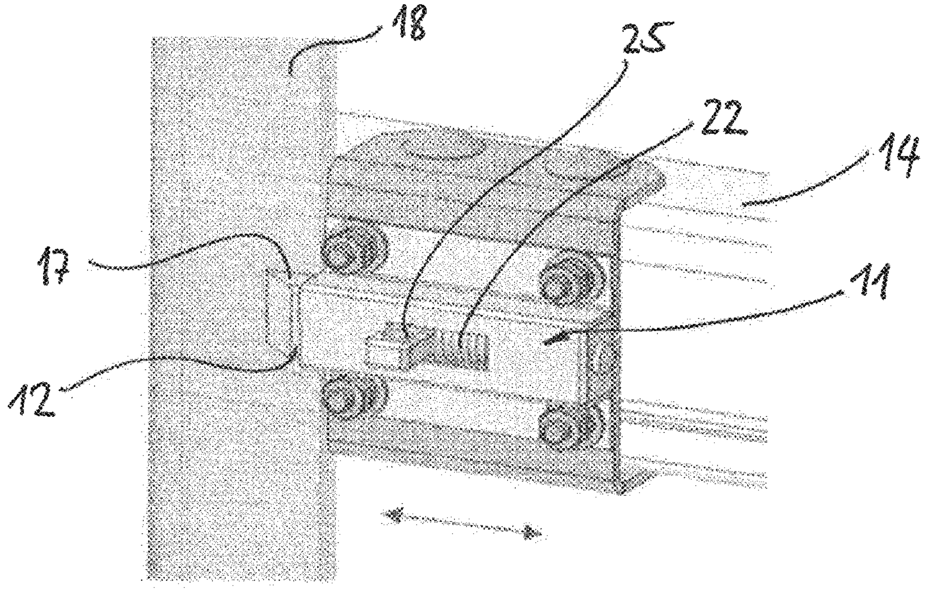
FIG. 7: is an enlarged perspective view of the guide rail engagement means from FIG. 6, FIG. 8: is a perspective detailed view of a balustrade engaging with a guide rail according to another exemplary embodiment.

FIG. 6 shows a guide rail 5 that is configured in approximately the same way as that of the previous exemplary embodiment according to FIG. 4. Here, however, the engagement or operative connection between balustrade 10 and guide rail 5 takes place via a latching mechanism. To form the guide rail engagement means, the balustrade 10 has a locking element 12 that can be latched into the guide rail 5 via its profile portion 18. The locking element 12 has a wedge-like latching lug 17 (FIG. 7). The latching lug 17 forms a ramp that interacts with the free end of the profile portion 18.

This variant with the locking element 12 that can be snapped into the guide rail 5 is particularly suitable for folding balustrades 10. When the balustrade 10 is moved or, more precisely, folded up from the folded-down position to the upright position, the latching connection is created automatically. For this purpose, as can be seen from FIG. 6, the balustrade 10 is advantageously arranged almost flush with the edge 13 of the roof 9.

In the secure position shown in FIG. 6, the profile portion 18 is clamped between the outside of the handrail 14 and the locking element 12 in the secure position. Because, as can be seen, the horizontal distance between the handrail 14 and the guide rail 5 is less than 10 cm, in order to protect the person carrying out the maintenance, it should be ensured, if possible, that the elevator car 2 is not moved up or down during the maintenance phase.

Further details of the latching mechanism for the guide rail engagement means 11 can be seen in FIG. 7. The locking element 12 is attached to the handrail 14 in a resilient and limitedly displaceable manner. 25 designates a release lever with which the locking element 12 can be moved to the right and thus the latching connection or the blocking position can be released and thus the secure position of the balustrade 10 can be eliminated. A spring 22 moves the release lever 25 back to the left. When the maintenance work is complete, the balustrade can be moved from the upright position back to the folded down position for normal operation after the secure position has been eliminated simply by laying the balustrade down.

Another variant of a guide rail engagement means 11 is shown in FIG. 8. Here, the guide rail engagement means 11 comprises a locking member denoted by 21, which can be moved from a rest position denoted by P1 into the blocking position P2 shown in FIG. 8. For this purpose, the locking member 21 is displaceably mounted on a diagonally running crossmember 31 of the balustrade 10. In order to automatically create the blocking position P2, the locking member 21 can be moved via an actuating mechanism having spring means, which actuating mechanism can be activated via a trigger element 26. When the folding balustrade 10 is folded up, the trigger element 26 contacts the guide rail 5, whereupon the spring force of the spring means moves the locking member 21 into the blocking position.

The exemplary embodiment according to FIGS. 9 to 12 shows a variant having a gravity-based actuating mechanism. The blocking arrangement 20 for the engagement means 11 has a locking member 21 that can be pivoted between a rest position and a blocking position for creating the secure position. The locking member 21 is mounted on the handrail 14 so as to be pivotable about a horizontal axis. The plate-shaped locking member 21 is rigidly connected to a lever arm 27. The lever arm 27 is secured in a holder 28 in the rest position. As soon as the balustrade 10 comes into contact with the guide rail 5 when it is folded up, the holder 28 is moved outward, releasing the lock of the lever arm 27 and swinging the lever arm downward. FIG. 9 shows the blocking arrangement 20 shortly before the balustrade 10 is completely folded up. FIG. 10 is a rear view of the blocking arrangement 20 in the same position as in FIG. 9. To reliably trigger the lock, the blocking arrangement 20 has a stamp-like contact element (not shown). The contact element is connected to the holder 28. When the handrail 14 strikes the guide rail 5 when the balustrade 10 is folded up, the stamp-like contact element is moved outward together with the holder 28.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system having an elevator car with a balustrade arranged on a roof of the elevator car as a fall protection for delimiting an accessible inner region on the roof, wherein the elevator car is movable up and down along guide rails, the elevator system comprising:

a guide rail engagement means arranged on the balustrade; and wherein the balustrade is supported against inward movement toward the inner region when the guide rail engagement means is engaged on one of the guide rails.

2. The elevator system according to claim 1 wherein the guide rail engagement means is arranged on a handrail of the balustrade.

3. The elevator system according to claim 1 wherein the balustrade is mounted adjacent to an edge of the roof of the elevator car, the edge running in a lateral longitudinal direction, wherein the one guide rail has a profile portion extending in the lateral longitudinal direction, and wherein the balustrade is adapted to be brought into engagement with the profile portion.

4. The elevator system according to claim 1 wherein the guide rail engagement means has a locking element adapted to be latched onto the one guide rail.

5. The elevator car according to claim 4 wherein to enable a latching connection of the balustrade to the one guide rail, the locking element is resiliently attached to a handrail of the balustrade and is limitedly displaceable.

6. The elevator system according to claim 4 wherein the balustrade is movable relative to the roof and the guide rail engagement means automatically provides a latching connection to the one guide rail with the locking element when the balustrade is moved into engagement with the one guide rail.

7. The elevator system according to claim 4 wherein the locking element has a wedge-like latching lug.

8. The elevator system according to claim 1 wherein the balustrade has a blocking arrangement forming the guide rail engagement means.

9. The elevator system according to claim 8 wherein the blocking arrangement has a locking member movable between a rest position and a blocking position, the locking member preventing movement of the balustrade in the blocking position.

10. The elevator system according to claim 9 wherein the locking member is pivotally mounted about a horizontal axis on a handrail of the balustrade.

11. The elevator system according to claim 9 wherein the blocking arrangement has a lever arm connected to the locking member.

12. The elevator system according to claim 9 wherein the balustrade has an inclined crossmember on which the locking member is displaceably mounted.

13. The elevator system according to claim 8 wherein the one guide rail has a profile portion, and the blocking arrangement includes a U-shaped engagement channel that, when the blocking arrangement is in a blocking position, engages around the profile portion of the one guide rail from a side.

* * * * *